United States Patent [19]

Buschbom et al.

[11] 4,373,600
[45] Feb. 15, 1983

[54] THREE WHEEL DRIVE VEHICLE

[75] Inventors: Floyd E. Buschbom, Long Lake; Glen D. Hansen, Maple Plain, both of Minn.

[73] Assignee: Veda, Inc., Long Lake, Minn.

[21] Appl. No.: 170,145

[22] Filed: Jul. 18, 1980

[51] Int. Cl.³ .......................... B62D 6/06; B60K 7/00
[52] U.S. Cl. ..................................... 180/212; 180/6.3; 180/6.48; 180/307; 180/308
[58] Field of Search ............... 180/211, 212, 213, 215, 180/6.3, 6.48, 291, 305, 306, 307, 308; 60/420, 421, 426, 484; 417/218

[56] References Cited

U.S. PATENT DOCUMENTS

| | | | |
|---|---|---|---|
| 2,272,603 | 2/1942 | Ellis | 180/26 |
| 2,651,377 | 9/1953 | Lapsley et al. | 180/6.3 |
| 2,681,117 | 6/1954 | Marcy | 180/305 |
| 2,942,677 | 6/1960 | Gray | 180/215 |
| 2,949,971 | 8/1960 | Cline | 180/6.3 |
| 3,156,313 | 11/1964 | Peterson | 180/6.48 |
| 3,234,856 | 2/1966 | Martin | 91/413 |
| 3,246,715 | 4/1966 | Pool et al. | 180/44 |
| 3,469,381 | 9/1969 | Burrough et al. | 180/6.3 |
| 3,576,106 | 4/1971 | Nowicki | 60/426 |
| 3,727,929 | 4/1973 | Keith et al. | 60/444 |
| 3,789,929 | 2/1974 | Leidig | 172/798 |
| 3,820,920 | 6/1974 | Klimaszewski | 417/218 |
| 3,901,339 | 8/1975 | Williamson | 180/307 |
| 3,924,706 | 12/1975 | Figora | 180/215 |
| 3,963,084 | 6/1976 | Misan | 180/26 |
| 4,116,294 | 9/1978 | Johnston | 60/421 |
| 4,157,125 | 6/1979 | Bushell et al. | 180/212 |
| 4,167,853 | 9/1979 | Hamma et al. | 60/329 |

Primary Examiner—Joseph F. Peters, Jr.
Assistant Examiner—Donn McGiehan
Attorney, Agent, or Firm—Burd, Bartz & Gutenkauf

[57] ABSTRACT

A motor vehicle having a pair of front drive wheels and a rear steerable drive wheel mounted on a main frame. A sub-frame secured to the main frame intermediate the front and rear drive wheels carries an internal combustion engine and a pump assembly. The pump assembly has a first pump operable to deliver fluid under pressure to fluid operated motors operably connected to the front drive wheels and a second pump operable to deliver fluid under pressure to a fluid operated motor operably connected to the rear drive wheel. The internal combustion engine and pump assembly are located below a seat and floor with both the engine and pump assembly positioned transversely of the main frame of the vehicle. The rear wheel is mounted on the frame for angular movement about a generally upright axis. A fluid operated double acting piston and cylinder assembly operates to angularly move the rear wheel about the upright axis to steer the vehicle.

29 Claims, 11 Drawing Figures

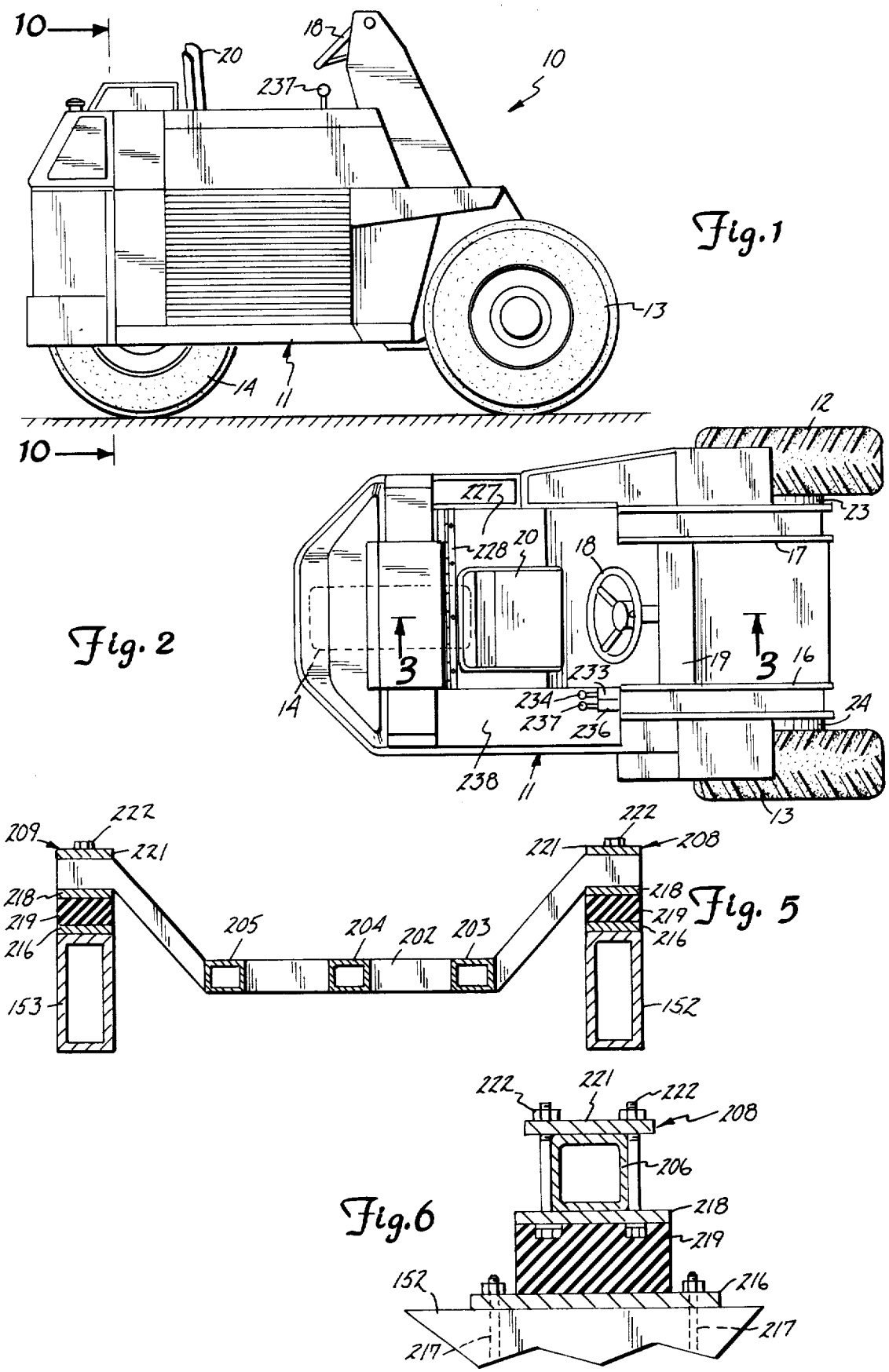

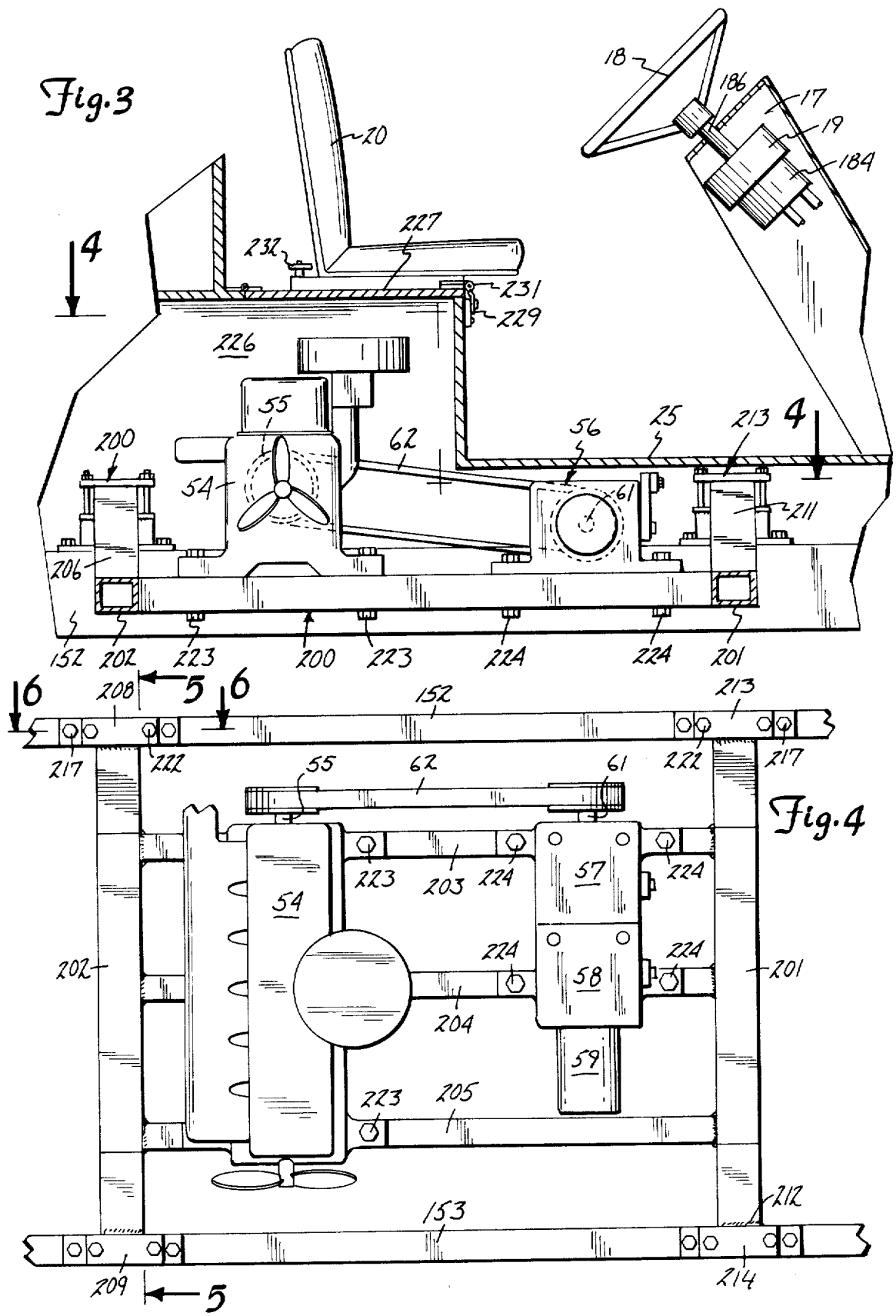

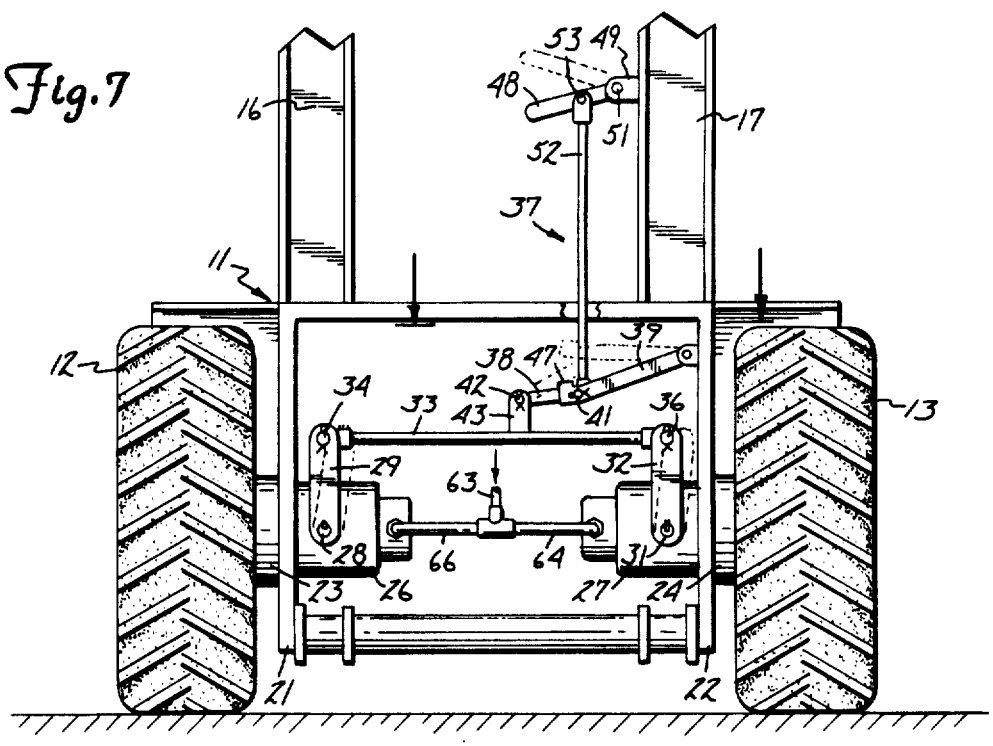
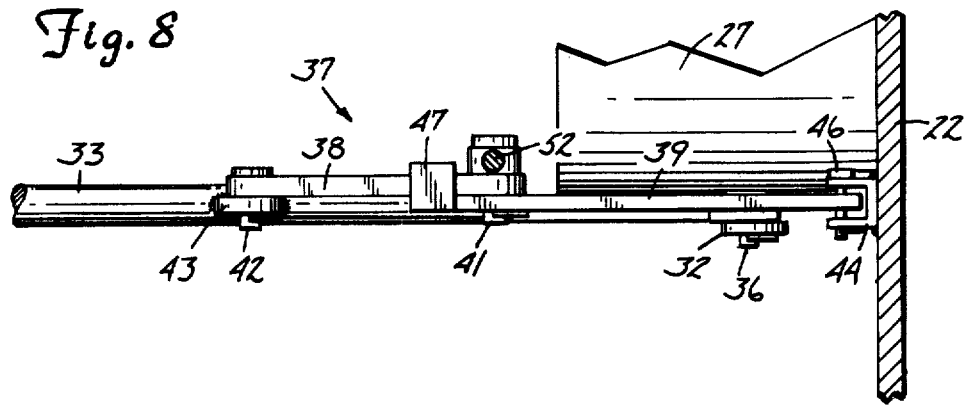

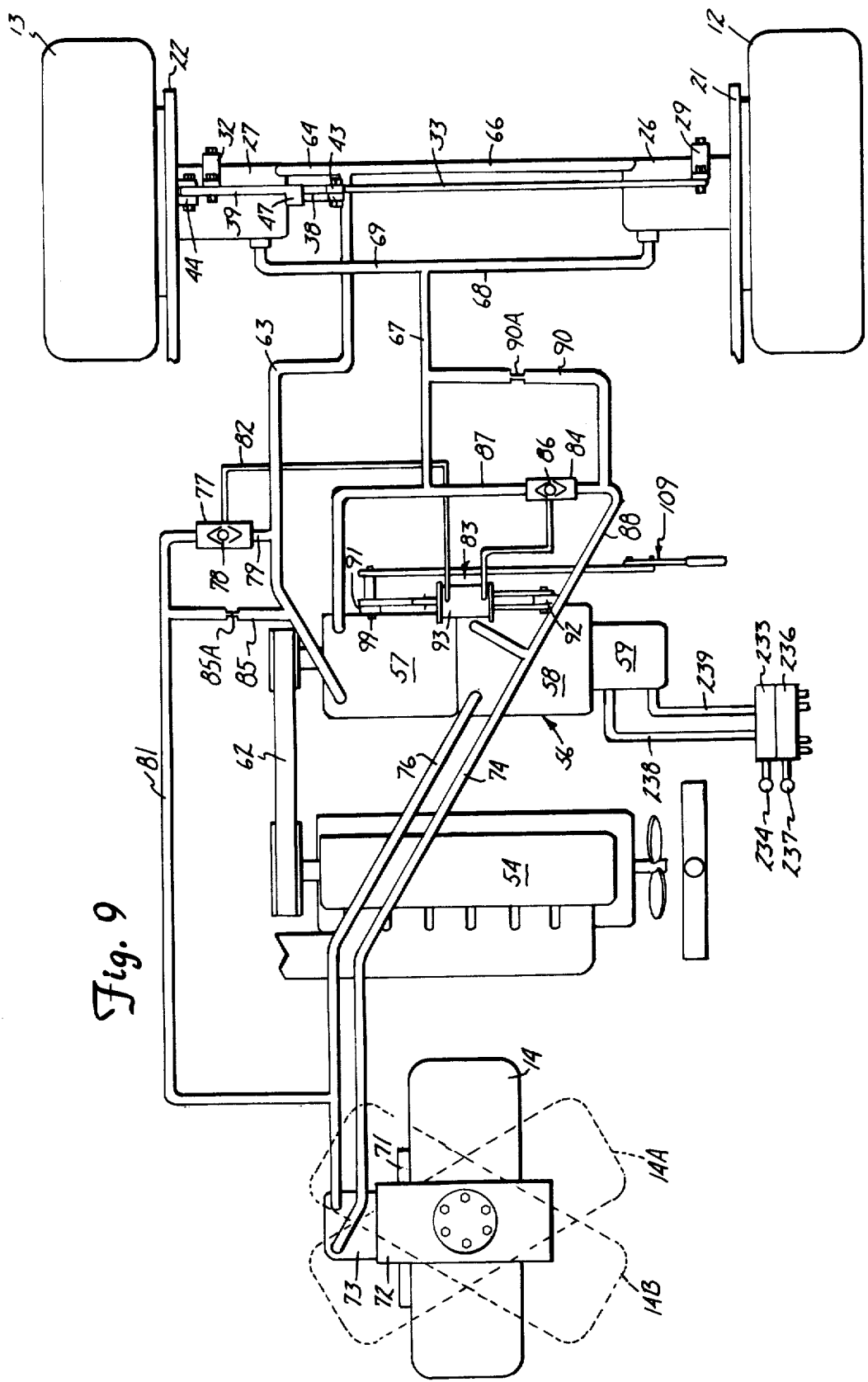

THREE WHEEL DRIVE VEHICLE

SUMMARY OF INVENTION

The invention relates to a land motor vehicle, as a tractor, truck, utility vehicle, or the like, having first drive wheel means and second drive wheel means concurrently driven by separate fluid operated motors. First and second fluid circuits carry fluid from separate pumps to the motors. Means having fluid restricting means interconnect the fluid circuits to allow the vehicle to make sharp turns without the use of wheel brakes. Longitudinal side beams extend along opposite sides of the vehicle. One of the drive wheel means is pivotally mounted to a portion of the vehicle frame for angular movement about a generally upright axis. Fluid power means operates to angularly move said one wheel means about the upright axis to steer the vehicle. The separate pumps and means for driving the pumps are mounted on a sub-frame carried by the longitudinal side beams. The means for driving the pump assembly is an internal combustion engine having a drive shaft operatively coupled to the driven shaft of the pumps with a power transmitting means. Mounts having resilient cushions connect the sub-frame to the longitudinal side beams to facilitate the installation and removal of the sub-frame, pumps, and engine as a unit from the vehicle.

The pumps are a pump assembly having a first pump operable to supply fluid under pressure to the first motors to concurrently drive the front wheels. The pump assembly also includes a second pump for supplying fluid under pressure to the second motor to drive the rear wheel. The first and second pumps are positive displacement pumps that are controlled to supply fluid under substantially the same fluid pressure to the first motors for the first wheel means and the second motor for the second wheel means so that the first wheel means and second wheel means have substantially the same torque and speed.

The sub-frame locates the pump assembly and engine between and transversely of the longitudinal side beams. The vehicle has a floor covering the pump assembly and a door means located over the engine. The door means is movable to an open position to provide access to the engine. A vehicle operator seat is mounted on the door means. The pump assembly includes a third or auxiliary pump operable to supply fluid under pressure to a valve assembly for directing fluid to fluid operated means, such as the lift arm cylinders and bucket tilt cylinder. The valve assembly is located on a deck positioned adjacent one side of the seat. The valve assembly includes manually operated means operable by the vehicle operator to control the lift and tilt cylinders.

An object of the invention is to provide a motor vehicle with a pair of driven front wheels and a driven steerable rear wheel operably associated with a fluid drive system that allows the vehicle to make a sharp turn without the use of wheel brakes. A further object of the invention is to provide a motor vehicle having a frame and a sub-frame operable to support an internal combustion engine and pump assembly driven by the engine in a transverse position on the frame. Another object of the invention is to provide a vehicle with an internal combustion engine and pump assembly that are located transversely and centrally of the vehicle under the vehicle operator seat and platform. A further object of the invention is to provide a sub-frame assembly for use in a motor vehicle that supports an internal combustion engine and pump assembly and allows installation and removal of sub-frame, engine, and pump assembly from the vehicle as a unit. These and other objects and advantages of the invention are hereinafter shown and described.

IN THE DRAWINGS

FIG. 1 is a side elevational view of the motor vehicle of the invention;

FIG. 2 is a top plan view of FIG. 1;

FIG. 3 is an enlarged sectional view taken along the line 3—3 of FIG. 2;

FIG. 4 is a sectional view taken along the line 4—4 of FIG. 3;

FIG. 5 is a sectional view taken along the line 5—5 of FIG. 4;

FIG. 6 is an enlarged sectional view taken along the line 6—6 of FIG. 4;

FIG. 7 is a front fragmentary elevational view of the vehicle of FIG. 1;

FIG. 8 is an enlarged sectional view taken along the line 8—8 of FIG. 7;

FIG. 9 is a diagrammatic view of the fluid drive system of the vehicle of FIG. 1;

DESCRIPTION OF PREFERRED EMBODIMENT

Figure 11:
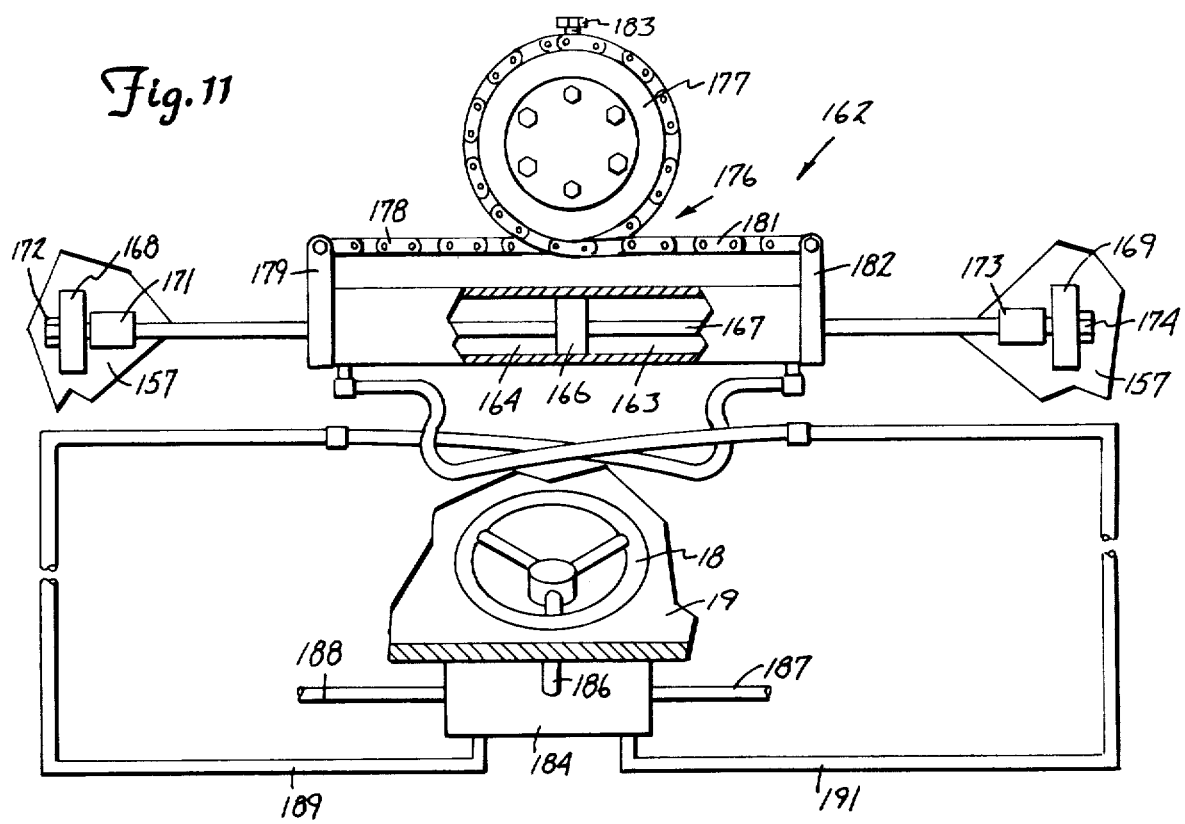
FIG. 11 is a diagrammatic view of the fluid power steering control for the steerable wheel of the vehicle of FIG. 1.

Referring to FIGS. 1 and 2, there is shown a motor vehicle indicated generally at 10 having a frame indicated generally at 11. Vehicle 10 is movably supported on a surface, such as the ground, with a pair of front drive wheels 12 and 13 and rear drive steerable wheel 14. Wheel 14 is located along the longitudinal center line of vehicle 10. A pair of upright posts 16 and 17 connected to the front of the frame are adapted to accommodate lift arms and like structures. Material handling units, such as buckets, clamps, and forks, are used with the lift arms to carry and transport a load, such as bulk material, including, but not limited to, feed, sand, coal, fertilizer, lime, earth, and the like. The forks associated with the lift arms can be used to move pallets, buckets, containers, and the like. Lift arms and a bucket mounted thereon associated with a motor vehicle are disclosed in co-pending U.S. Patent Application Ser. No. 170,597. The lift arms, bucket, and fluid controls therefor of U.S. Patent Application Ser. No. 170,597 are incorporated herein by reference. A steering wheel 18 rotatably mounted on a panel or transverse member 19 secured to posts 16 and 17 is used to control the turning of steerable wheel 14 about an upright axis to steer the vehicle. A seat 20 is located behind steering wheel 18.

Referring to FIG. 7, frame 11 has longitudinal side plates 21 and 22. Front wheels 12 and 13 are drivably connected to power transmissions or gear drives 23 and 24, respectively, mounted on side plates 21 and 22. A first motor 26 connected to gear drive 23 operates to transmit power to the gear drive 23. A second motor 27 mounted on gear drive 24 transmits power thereto. Gear drives 23 and 24 can be planetary gear transmissions. Other types of power transmissions can be used to couple motors 26 and 27 to wheels 12 and 13. Motors 26 and 27 are operated by fluid under pressure. The term fluid refers to hydraulic fluid, pneumatic fluid, or steam.

Motors 26 and 27 are variable displacement axial piston hydraulic fluid motors having controlled cams to vary the stroke of the pistons. The motors can be Vickers MV-19 hydraulic motors made by Sperry-Vickers, Troy, Mich. Motor 26 has a control shaft 28 for controlling the position of the cam or swash plate. A generally upright arm 29 attached to shaft 28 is movable to rotate shaft 28 and thereby change the position of the cam in the motor. Motor 27 has a control shaft 31 for controlling its cam which, in turn, is used to vary the stroke of the pistons in the motor. An upright arm 32 is fixed to shaft 31. The upper free ends of arms 29 and 32 are connected with a generally horizontal tie rod 33. Pivot pins 34 and 36 pivotally connect the outer ends of arms 29 and 32 to opposite ends of rod 33 whereby the arms 29 and 32 move together to simultaneously change the speed and torque of the motors 26 and 27. The arms 29 and 32 are normally located in a position wherein motors 26 and 27 are in half stroke. The tie rod 33 is movable in a direction to move the arms 29 and 32 from their normal half stroke positions to their full stroke positions.

A manually operated control indicated generally at 37 operatively connected to rod 33 functions to move rod 33 and thereby simultaneously move arms 29 and 32 to concurrently adjust the strokes of the pistons in the motors 26 and 27, thereby controlling the speed and torque delivered by each motor 26 and 27. As shown in FIG. 4, control 37 has an overcenter linkage comprising a first link 38 and a second link 39 pivoted together with a pivot bolt 41. First link 38 is pivotally connected with a bolt or pivot pin 42 to an upright ear 43 secured to rod 33. Second link 32 has an outer end pivoted with a bolt 46 to a bracket 44 secured to side plate 22 with a weld or the like. The inner end of second link 39 has a stop or projection 47 adapted to engage a portion of the first link 38 to hold the linkage in an over-center position, as shown in FIG. 3. When over-center linkage is in its down or over-center position, the arms 29 and 32 are held in their half stroke positions.

A hand lever 48 is pivotally connected to the inside of post 17 with a bracket 49. A pivot pin 51 pivotally connects the inner end of lever 48 to bracket 49. Lever 48 is connected to toggle link bolt 41 with a push-pull link or rod 52. A pivot pin 53 pivotally connects the upper end of the rod to lever 48. Lever 48 can be provided with releasable position holding or lock structure (not shown) operable to hold the lever in a selected position thereby holding motor control arms 29 and 32 in selected positions. Thus, motors 26 and 27 can be adjusted to operate in any desired position from half stroke to full stroke piston displacement.

In use, when lever 48 is in the down position, as shown in full lines in FIG. 3, toggle links 38 and 39 are in their over-center positions. This locates arms 29 and 32 at their half stroke positions. When hand lever 48 is moved to the up position, as shown in broken lines, toggle links 38 and 39 break open moving the tie rod 33 to the left, thereby moving the arms 29 and 32 and repositioning the cams in motors 26 and 27 to allow for full stroking of the pistons. This reduces the speeds of motors 26 and 27 and increases their torque or power output.

The diagrammatic view of the hydraulic power system is shown in FIG. 9. The primary power is derived from an internal combustion engine 54 having a drive or power output shaft 55. Engine 54 drives a pump assembly 56 comprising first, second, and third pumps 57, 58 and 59. Pump assembly 56 has a driven shaft 61 drivably connected to engine drive shaft 55 with a belt and pulley power transmission 62. Drive shaft 55 and driven shaft 61 are positioned parallel to each other and extend transversely of the frame side beams 152 and 153. Common drive shaft 61 for pumps 57 and 58 eliminates the need of a splitter gear box to distribute engine power to front wheels 12 and 13 and rear wheel 14 which have the same diameter.

First pump 57 is operable to supply hydraulic fluid under pressure to a first fluid circuit connected to motors 26 and 27 drivably connected to front wheels 12 and 13. Hydraulic fluid under pressure flows through a line 63 into branch lines 64 and 66 connected to motors 26 and 27, respectively. A second line 67 connects pump 57 to motors 26 and 27. Line 67 is joined with branch lines 68 and 69 leading to motors 26 and 27. When pump 57 delivers hydraulic fluid under pressure to line 63 motors 26 and 27 drive wheels 12 and 13 in a forward direction. Hydraulic fluid flows from motors 26 and 27 via line 67 back to the pump or a suitable reservoir. When pump 57 delivers hydraulic fluid under pressure to line 67 motors 26 and 27 drive wheels 12 and 13 in the reverse direction. The return flow is through line 63.

Second pump 58 is operable to supply hydraulic fluid under pressure to a second fluid circuit connected to a hydraulic motor 73 operable to drive wheel 14. Wheel 14 is operatively connected to a gear drive 71 mounted on a support member 72. Support member 72 is part of the structure that is used to move wheel 14 about a generally upright axis to steer vehicle 10. A first line 74 connects pump 58 to motor 73. A second line 76 also connects pump 58 to motor 73 whereby pump 58 is operable to selectively drive motor 73 in forward and reverse directions. Motor 73 is a positive displacement piston hydraulic motor of the same size and type as motors 26 and 27. Motor 73 operates at full stroke. With front motors 26 and 27 operating at half stroke and their rear motor 73 operating at full stroke, substantially the same power is developed by the two front powers applied to two front wheels 12 and 13 and rear wheel 14.

A first flow control valve 77 having a moving valving member or shuttle ball 78 is connected to a line 79 joined with line 63. Valve 77 is connected with line 81 to line 76. A third line 82 connects valve 77 with a control piston and cylinder unit 83 hereinafter described. Ball 78 is responsive to differences in fluid pressures in lines 63 and 76 to deliver fluid under pressure to line 82. When the pressure in line 63 is greater than the fluid pressure in line 76, shuttle ball 78 will move to the left blocking the flow of fluid to line 81. The fluid flows through line 82 to the piston and cylinder unit 83. Unit 83 operates to increase the flow and pressure of the second pump 58 thereby increasing the fluid pressure in line 76 until the fluid pressure in lines 63 and 76 is substantially equal or balanced. Lines 63 and 81 are connected with an interconnecting line or pipe 85 having a fluid flow restriction or orifice 85A to limit the flow of fluid between the first and second fluid circuits coupled to pumps 57 and 58. Restriction 85A is a relatively small passage; for example, 1/16 inch, located in a parallel fluid flow relationship with shuttle valve 77. When rear wheel 14 is turned to a sharp turn position, as shown in broken lines at 14A or 14B, wheel 13 will rotate in a reverse direction as the center of rotation is behind wheels 12 and 13. The fluid operated motor 27 acts as a pump to increase the pressure of the fluid in line 63. Fluid under high pressure in line 63 is forced through restriction 85A into line 81. This increases the fluid pressure in line 81 and adds to the pressure of the fluid supplied to rear wheel drive motor 73. In sharp turn conditions it is desirable to have maximum torque applied to rear wheel 14, as wheel 14 provides the drive to swing the vehicle about the turning axis.

Lines 67 and 88 are connected with a pipe or line 90 having a restriction or orifice 90A. Line 90 is in a parallel fluid flow relationship with shuttle valve 84. Restriction 90A limits the flow of fluid between the first and second fluid circuits when the vehicle is driven in a reverse direction. Restriction 90A is the same size as restriction 85A and functions in an identical manner. When vehicle 10 is driven in reverse and wheel 14 is in a sharp turn, one of the front wheels 12 or 13 is driven in the forward direction. The fluid motor associated with the wheel acts as a pump which increases the pressure of the fluid in line 67. This forces fluid through restriction 90A and increases the pressure in fluid in line 74 and results in an increase in the torque of wheel 14. This allows vehicle 10 to make sharp turns in both the forward and reverse direction of travel without the use of wheel brakes.

A second flow control valve 84 having a shuttle ball 86 is connected with line 87 to line 67 and with line 88 to line 74. A third line 89 connects valve 84 to the control piston and cylinder unit 83. Control valve 84 functions when the vehicle is driven in the reverse direction. When the fluid in line 67 is greater than the pressure of the fluid in line 74, shuttle ball 86 blocks the flow of fluid to line 88. The fluid flows from valve 84 via line 89 to the piston and cylinder unit 83 which moves the control for the second pump 58 to a position to increase the pressure of the fluid delivered to line 74 until the fluid pressure in lines 67 and 74 is substantially equal. Valves 77 and 84 function to equalize the fluid pressure delivered to the front motors 26 and 27 with the rear motor 73 in both the forward and reverse directions. When the pressure of the hydraulic fluid delivered to the front motors 26 and 27 and the pressure of the hydraulic fluid delivered to the rear motor 73 is substantially equal, the power or torque and speed delivered by motors 26, 27 and motor 73 to front wheels 12 and 13 and rear wheel 14 is substantially equal.

Pumps 57 and 58 are variable displacement axial piston hydraulic fluid transmission units. Pump 57 has an upwardly directed control arm 91. Pump 58 has an upwardly directed control arm 92. Control arms 91 and 92 are movable to change the position of internal cams to vary the stroke of the pump pistons to control the rate and direction of flow of hydraulic fluid delivered by the pumps. Arms 91 and 92 are angularly movable from a central neutral position to a right or reverse position and a left or forward position. Pumps 57 and 58 are identical units. They can be Vickers TA-19 positive displacement piston pumps made by the Sperry-Vickers, Troy, Mich. These pumps are known as swash plate pumps, which have a rotating body carrying pistons cooperating with the adjustable cam plate to vary the output capacity of the pump. A variable displacement pump of the axial piston type is shown in FIG. 24, Chapter 14, page 14 of *Mark's Standard Handbook for Mechanical Engineers*, 7th Edition, McGraw-Hill Book Co., 1958.

Control piston and cylinder unit 83 is pivotally connected with a pin 107 to pump arm 92. The piston rod 96 is pivotally connected with a pin 99 to pump arm 91. A manual control indicated generally at 109 is connected with a link or rod 108 to the pump arm 91. Control apparatus 109 functions in response to a foot pedal to move the pump arm 91 and thereby control the fluid output of pump 57. Piston and cylinder unit 83 being connected to both arms 91 and 92 moves the arm 92 concurrently with the movement of the arm 91 thereby changing the fluid output of the pump 58 in relation to the fluid output of the pump 57. Relative movement between the arms 91 and 92 caused by operation of the piston and cylinder unit 83 responds to differential fluid pressure delivered by the pumps 57 and 58 to adjust the output of the pump 58 so as to equalize the fluid pressure. The detailed description of the structure and operation of the piston and cylinder unit 83 and control apparatus 109 is disclosed in co-pending U.S. Patent Application Ser. No. 169,191. The disclosure of this Application is incorporated herein by reference.

Referring to FIGS. 3, 4, and 5, frame 11 includes a pair of longitudinal box beams or side frame members 152 and 153. Members 152 and 153 extend along adjacent side portions of the vehicle rearwardly of the front drive wheels 12 and 13. The internal combustion engine 54 and pump assembly 56 are located transversely between the frame members 152 and 153 with the engine 54 positioned between seat 20 and pump assembly 56 positioned below the deck or floor board 25.

Engine 54 and pump assembly 56 are supported on a common rigid sub-frame assembly indicated generally at 200. Sub-frame assembly 200 has a pair of transverse members or beams 201 and 202 longitudinally spaced from each other and secured by welds to three longitudinal members 203, 204, and 206. As shown in FIG. 5, transverse member 202 has a generally horizontal mid-section and upwardly and outwardly directed opposite end portions 206 and 207. Member 201 is identical in shape to member 202. Both members 201 and 202 are generally U-shaped with a generally horizontal mid-section. The opposite ends of the longitudinal members 203, 204, and 205 are secured by welds to the mid-sections of the transverse members 201 and 202 to provide a rigid sub-frame assembly.

Mounts 208 and 209 secure the opposite end portions 206 and 207 to the longitudinal frames 152 and 153. Mounts 123 and 214 are identical to mounts 208 and 209 and secure the opposite end portions 211 and 212 of transverse member 201 to frame members 152 and 153. Mounts 208, 209, 213, and 214 are resilient cushion structures that attenuate vibrations emanating from engine 54 and pump assembly 56. As shown in FIG. 6, mount 208 has a base 216 located in engagement with the top of longitudinal beam 152. A plurality of nut and bolt assemblies 217 secure the base to the frame member 152. Located above base 216 is a top plate 218 providing a support for the end portion 206 of transverse member 202. A block 219 of resilient material, as rubber, is located between base 216 and top plate 218. The opposite surfaces 219 are bonded with suitable adhesives to the base 216 and top plate 218 so that the resilient block 219 functions as a yielding cushion or spring for the engine 54, pump assembly 56, and sub-frame assembly 200. The end portion 206 is retained on top plate 219 with a clamp plate 221 and a plurality of nut and bolt assemblies 222. Other means can be used to attach the end portion 206 to top plate 218. The mounts 207, 213, and 212 are identical to the mount 208, as shown in FIG. 6.

As shown in FIG. 3, a plurality of nut and bolt assemblies 223 secure the mounts for the engine 54 to the longitudinal members 203, 204, and 205. To locate the engine transversely of the longitudinal frame members 152 and 153. Nut and bolt assemblies 224 secure pump assembly 56 to sub-frame members 203 and 204. Pump assembly 56 is located in a transverse position between longitudinal frame members 152 and 153 on the forward side of the engine 54. The pump driven shaft 61 is positioned generally parallel to the engine drive shaft 55. The parallelism between shafts 55 and 61 is maintained by the rigid sub-frame assembly 200.

In use, engine 54 and pump assembly 56 are mounted on the sub-frame assembly 202. The power transmission 62 operatively interconnects the engine shaft 55 and pump shaft 61. This structure is initially assembled as a unit and mounted as a unit on longitudinal frame members 152 and 153. Mounts 208, 209, 213, and 214 are then secured to the opposite end portions 206 and 207 and 211 and 212 of transverse members 201 and 202. Alignment and separate mountings of the engine 54 and pump assembly 56 is not necessary after the sub-frame assembly 200 is mounted on longitudinal frame members 152 and 153.

As shown in FIG. 3, engine 53 is located in an engine chamber or compartment 226 located below a top wall or door 227 supporting seat 200. A transverse hinge 228 transversely mounts the door 227 to a transverse rear portion 228 of the frame 11. Hinge 228 allows the door 227 to pivot upwardly to an open position providing access to engine chamber 226. This facilitates the servicing and repair of the engine 54. A plurality of releasable latches or hasps 229 hold the door in its normally closed position.

Seat 220 is mounted on door 227 with a hinge assembly 231. Holding locks 232 secure the back of the seat 220 to door 227 to hold the seat in its normally horizontal position. Holding locks 232 can be released allowing the seat to pivot in the forward direction. This permits door 227 to move to its full open position. Floor 25 can be removed from the frame 11 thereby allowing the entire sub-frame assembly 200 carrying engine 54 and pump assembly 57 to be installed or removed as a single assembly from vehicle 10.

Pump 59 is an auxiliary pump used to provide a source of fluid pressure, such as hydraulic fluid under pressure, to operate the fluid power steering motor, lift arm lift cylinders, and bucket tilt cylinder of the vehicle. The hydraulic fluid pump 59 is directed to a pair of manual control valves 233 and 236 for operating the lift cylinders and bucket tilt cylinders (not shown) used with the vehicle 10. Valve 233 has a hand-operated lever used to regulate the flow of fluid through the valves 233 and thereby control the lift arms. Valve 236 has a hand-operated lever 237 used to control the tilt cylinder associated with the lift arms. Hydraulic fluid carrying lines 238 and 239 connect pump 59 with valves 233 and 236. As shown in FIG. 2, the left side of the vehicle has a top wall or shelf 238 located longitudinally adjacent the seat 220. The valves 233 and 236 are located or mounted on the shelf adjacent the front side of seat 220 laterally of steering wheel 18. The hand-operated levers 234 and 236 are readily accessible to the right hand of the vehicle operator.

Figure 10:
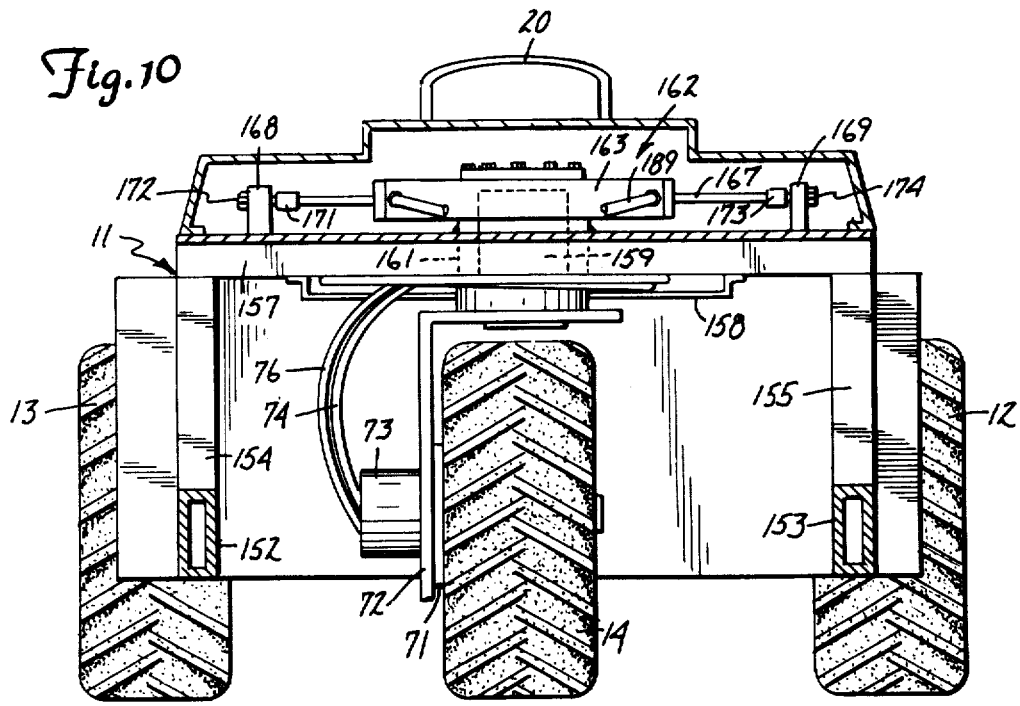
FIG. 10 is an enlarged sectional view taken along the line 10—10 of FIG. 1.

Referring to FIG. 10, longitudinal box side beams 152 and 153 support upright members 154 and 155. A cross member 157 is attached to the upper ends of the upright members 154 and 156. Cross member 157 carries a support bracket 158 for the fluid lines or hoses 74 and 76 connected to the fluid operated motor 73. Hoses 74 and 76 are coiled about the upright or turning axis of wheel 14. Wheel support member 72 is secured to an upright cylindrical member or post 159 rotatably mounted on cross member 157 with a bearing 161.

A power unit indicated generally at 162 is operable to rotate wheel 14 about the upright axis of post 159 to steer vehicle 10. Power unit 162, as shown in FIG. 11, comprises an elongated cylinder 163 having a chamber 164. A piston 166 slidably disposed in chamber 164 is secured to a linear piston rod 167. The left end of rod 167 is attached to a fixed support 168 with a sleeve 171 and bolt 172. The right end of 154 is attached to a fixed support 169 with a sleeve 173 and a bolt 174. Supports 168 and 169 are secured to cross member 157.

A motion transmission apparatus indicated generally at 176 operatively connects power unit 162 with a hub 177 so that on operation of the power unit the wheel 14 is rotated about the axis of the post. The motion transmitting apparatus 176 is connected to a disc or hub 177 secured to the top of post 159. Apparatus 176 comprises a first chain 178 secured to an end block 179 on one end of cylinder 163 and a second chain 181 secured to an end block 182 and the opposite end of cylinder 163. Chains 178 and 181 extend around hub 177 in opposite directions and are attached to hub 177 with a bolt 183. Hydraulic fluid under pressure is supplied to the opposite ends of the chamber 164 in response to operation of a steering valve 184. Valve 184 mounted on panel 19 is operatively connected to steering wheel 18 with a steering shaft 186. Hydraulic fluid under pressure is supplied to valve 184 by auxiliary pump 59 via fluid input line 187. A return line 188 is used to return the fluid to a reservoir and inlet of pump 59. A pair of lines 189 and 191 connect the valve 184 to opposite ends of the cylinder 163. The details of steering valve 184 and the operation thereof are set out in the co-pending U.S. Patent Application Ser. No. 165,745. The disclosure of this Application is incorporated herein by reference.

While there is shown and described a fluid drive transmission for a wheel land vehicle, it is understood that changes in parts, numbers of drive and steerable wheels, size of parts, pumps, and motors may be made by one skilled in the art without departing from the invention. The invention is defined in the following Claims.

The embodiments of the invention in which an exclusive property or privilege is claimed are defined as follows:

1. A vehicle comprising: a frame having a first portion and second portion, first wheels operatively connected to the first portion of the frame, fluid operated first motors, one of said first motors being drivably connected to one first wheel, the other of said first motors being drivably connected to the other first wheel, second wheel means operatively connected to the second portion of the frame, a fluid operated second motor drivably connected to the second wheel means, a pump assembly having a first pump for supplying fluid under pressure to the first motors, and a second pump for supplying fluid under pressure to the second motor whereby said first motors and second motor concurrently operate to drive the first wheels and second wheel means, means for operating said pump assembly, sub-frame means mounted on the frame, means mounting the pump assembly and means for operating said pump assembly on said sub-frame means, mount means releasably connecting the sub-frame means on the frame whereby the pump assembly, means for operating said pump assembly, and sub-frame means can be removed as a unit from the frame, means for rotatably mounting said second wheel means on said frame for angular movement about a generally upright axis, and means for angularly moving said second wheel means about said upright axis to steer said vehicle.

2. The vehicle of claim 1 wherein: each of said first motors and said second motor is a positive displacement piston motor.

3. The vehicle of claim 2 including: control means to vary the speed and torque of said first motors.

4. The vehicle of claim 1 wherein: said first motors and said second motor transmit about the same amount of torque to the first wheels and second wheel means, respectively.

5. The vehicle of claim 4 wherein: each of said first motors and said second motor is a positive displacement piston.

6. The vehicle of claim 1 including: first power transmission means connecting the first motors to the first wheels, and second power transmission means connecting the second motor to the second wheel means.

7. The vehicle of claim 1 including: control means connected to the first and second pumps for varying the amount of fluid delivered by said first and second pumps to said first and second motors.

8. The vehicle of claim 1 wherein: said mount means includes resilient means interposed between the sub-frame means and the frame.

9. The vehicle of claim 1 wherein: said frame includes longitudinal orientated first and second side beams, said sub frame means, pump assembly and means for operating said pump assembly being transversely orientated relative to the side beams.

10. The vehicle of claim 9 wherein: said sub-frame means is mounted on the first and second side beams, and means connecting the pump assembly and means for operating the pump assembly on the sub-frame means.

11. The vehicle of claim 10 wherein: said pump assembly has a driven shaft, said means for operating the pump assembly being an internal combustion engine having a drive shaft, and power transmitting means operatively connecting said drive and driven shafts.

12. The vehicle of claim 9 wherein: said sub-frame means includes transverse members mounted on the first and second side beams, and longitudinal members secured to the transverse members.

13. The vehicle of claim 12 wherein: said mount means connects said transverse members to said first and second side beams.

14. The vehicle of claim 13 wherein: said mount means includes resilient means interposed between the transverse members and said first and second side beams.

15. The vehicle of claim 1 including: floor means located over said pump assembly, door means located adjacent said floor means and over said means for operating said pump assembly, seat means located on said door means, said door means being movable to an open position to provide access to said means for operating said pump assembly.

16. The vehicle of claim 1 including: vehicle operator seat means, means supporting said seat means on the frame, said pump assembly including a third pump for supplying fluid under pressure to valve means operably connected to fluid operated means, means mounting said valve means on said frame adjacent one side of said seat means, said valve means having manually operable means useable by the operator of the vehicle to actuate said valve means to control the flow of fluid to said operated means.

17. The vehicle of claim 1 including: first fluid circuit means connecting said first pump with said first motors, second fluid circuit means connecting said second pump with said second motor means, and means having fluid flow restricting means interconnecting the first fluid circuit means with the second fluid circuit means whereby fluid under high pressure in one fluid circuit means flows to the other fluid circuit means.

18. The vehicle of claim 1 including: first fluid circuit means connecting said first pump with said first motors, second fluid circuit means connecting said second pump with said second motor means, said first fluid circuit means including a first line for carrying fluid from the first pump to the first motors for driving the first motors in a foward direction, and a second line for carrying fluid from the first pump to the first motors for driving the first motors in a reverse direction, said second fluid circuit means including a first line for carrying fluid from the second pump to the second motor means for driving said second motor means in a forward direction, and a second line for carrying fluid from the second pump to the second motor means for driving said second motor means in a reverse direction, first means having fluid flow restricting means interconnecting the first lines of the first and second fluid circuit means whereby fluid under high pressure in one of the first lines flows to the other first line to increase the fluid pressure in said other first line, and second means having fluid flow restricting means interconnecting the second lines of the first and second fluid circuit means whereby fluid under high pressure in one of the second lines flows to the other second line to increase the fluid pressure in said other second line.

19. A vehicle comprising: a frame having a first portion and a second portion, first wheels operatively connected to the first portion of the frame, fluid operated first motors, one of said first motors being drivably connected to one first wheel, the other of said first motors being drivably connected to the other first wheel, second wheel means operatively connected to the second portion of the frame, a fluid operated second motor drivably connected to the second wheel means, a pump assembly having a first pump for supplying fluid under pressure to the first motors, and a second pump for supplying fluid under pressure to the second motors, whereby said first motors and second motors concurrently operate to drive the first wheel means and the second wheel means, means for operating said pump assembly, said frame includes first and second beams longitudinally located generally along opposite sides of the vehicle, said pump assembly having a driven shaft, said means for operating said pump assembly being an internal combustion engine having a drive shaft, power transmitting means operably connecting said drive shaft with said driven shaft whereby said engine powers said pump assembly, sub-frame means mounted on the first and second beams, means connecting the pump assembly and engine to said sub-frame means locating said pump assembly and engine transversely of said first and second beams, and means releasably mounting the sub-frame means on the first and second beams whereby the pump assembly, engine, and sub-frame means can be removed as a unit from the frame.

20. The vehicle of claim 19 wherein: said sub-frame means has a plurality of transverse members mounted on the first and second beams, and a plurality of longitudinal members secured to the transverse members, said means connecting the pump assembly and engine to said sub-frame means being connected to said longitudinal members.

21. The vehicle of claim 9 including: end portions on the transverse members, said means releasably mounting the sub-frame means including mount means connecting said end portions of the transverse members to the first and second beams, said mount means including resilient means located between said end portions and the first and second beams.

22. The vehicle of claim 19 wherein: said means releasably mounting the sub-frame means includes mount means connecting the sub-frame means to the first and second beams, said mount means including resilient means arranged to dampen vibrations.

23. A land vehicle comprising: a frame, a first wheel means and second wheel means connected to the frame to support the frame on the ground, first drive means operably connected to the first wheel means to rotate said first wheel means, said first drive means having fluid operated first motor means, second drive means operably connected to the second wheel means, said second drive means having fluid operated second motor means, first pump means for supplying fluid under pressure to a first fluid circuit connected to the first motor means, second pump means for supplying fluid under pressure to a second fluid circuit connected to the second motor means, means for concurrently operating the first and second pump means whereby said first and second pump means supplies fluid under pressure to the first and second fluid circuits thereby operating said first and second motors to drive the first and second wheel means, said first and second pump means each having control means operable to vary the rate of flow of fluid discharged by the first and second pump means, means connected to the control means of one of the pump means operable to actuate the control means of said one of the pump means, means operable in response to a difference in the pressure of the fluid in the first and second fluid circuits to actuate the control means of other pump means to alter the rate of flow of fluid discharged by the other pump means to substantially balance the pressure of the fluid in the first and second fluid circuits thereby maintaining the torque and speed input to the first and second drive wheel means substantially constant, and means having fluid flow restricting means interconnecting the first fluid circuit with the second fluid circuit whereby fluid under high pressure in one fluid circuit flows to the other fluid circuit increasing the pressure of the fluid therein, said means operable in response to a difference in the pressure of the fluid in the first and second fluid circuits to actuate the control means of the other pump means to alter the rate of flow of fluid discharged by the other pump means includes a piston and cylinder assembly connected to the control means of both pump means, and shuttle valve means connected to said first and second fluid circuits in parallel with said means having fluid flow restricting means to receive fluid under pressure therefrom and direct fluid to the piston and cylinder assembly, said shuttle valve means operable in response to a difference in fluid pressure in the first and second fluid circuits to selectively expand and contract the piston and cylinder assembly thereby operating the control means of the other pump means to alter the fluid flow rate of the other pump means in a manner to balance the pressure of the fluid in the first and second fluid circuits thereby maintaining the torque and speed input to the front and rear drive wheel means substantially constant.

24. The vehicle of claim 23 wherein: the first wheel means includes a pair of front drive wheels, the first drive means includes a pair of fluid operated first motors operably connected to the pair of front drive wheels, each first motor having positive displacement means, and means for controlling the operation of said displacement means to vary the speed and torque of each of said first motors.

25. The vehicle of claim 24 wherein: the second motor means includes a second motor having positive displacement means, said second motor operable to provide torque to said second wheel means in an amount substantially the same as the torque developed by said first motors.

26. The vehicle of claim 23 wherein: the means operable in response to a difference in the pressure of the fluid in the first and second fluid circuits to actuate the control means of the other pump means to alter the rate of flow of fluid discharged by the other pump means includes a piston and cylinder assembly connected to the control means of both pump means, and shuttle valve means connected to said first and second fluid circuits in parallel with said means having fluid flow restricting means to receive fluid under pressure therefrom and direct fluid to the piston and cylinder assembly, said shuttle valve means operable in response to a difference in fluid pressure in the first and second fluid circuits to selectively expand and contract the piston and cylinder assembly thereby operating the control means of the other pump means to alter the fluid flow rate of the other pump means in a manner to balance the pressure of the fluid in the first and second fluid circuits thereby maintaining the torque and speed input to the front and rear drive wheel means substantially constant.

27. The vehicle of claim 23 wherein: the first pump means and second pump means each comprise a variable displacement pump having positive displacement means, said control means being operatively connected to the displacement means whereby operation of the control means moves the displacement means to vary the rate of flow of fluid discharged by each pump.

28. A land vehicle comprising: a frame, first wheel mans and second wheel means connected to the frame to support the frame on the ground, first drive means operably connected to the first wheel means to rotate said first wheel means, said first drive means having fluid operated first motor means, second drive means operably connected to the second wheel means, said second drive means having fluid operated second motor means, first pump means for supplying fluid under pressure to a first fluid circuit connected to the first motor means, second pump means for supplying a fluid under pressure to a second fluid circuit connected to the second motor means, means for concurrently operating the first and second pump means whereby said first and second pump means supplies fluid under pressure to the first and second fluid circuits thereby operating said first and second motors to drive the first and second wheel means, said first and second pump means each having control means operable to vary the rate of flow of fluid discharged by the first and second pump means, means connected to the control means of one of the pump means operable to actuate the control means of said one of the pump means, means operable in response to a difference in the pressure of the fluid in the first and second fluid circuits to actuate the control means of other pump means to alter the rate of flow of fluid discharged by the other pump means to substantially balance the pressure of the fluid in the first and second fluid circuits thereby maintaining the torque and speed input to the first and second drive wheel means substantially constant, and means having fluid flow restricting means interconnecting the first fluid circuit with the second fluid circuit whereby fluid under high pressure in one fluid circuit flows to the other fluid circuit increasing the pressure of the fluid therein, said means operable to actuate the control means of the other pump means includes a piston and cylinder unit operably connected to the control means of both of said pump means, and shuttle vavle means connecting the unit with said first and second fluid circuits in parallel with said means having fluid flow restricting means, said shuttle valve means being operable in response to a difference in fluid pressure of the first and second fluid circuits to supply fluid to said unit to control the fluid output of the other pump means in a manner to substantially balance the fluid pressure in the first and second fluid circuits.

29. The vehicle of claim 28 including: said first fluid circuit including a first line for carrying fluid from the first pump means to the first motor means for driving the first motor means in a forward direction, and a second line for carrying fluid from the first pump means to the first motor means for driving the first motor means in a reverse direction, said second fluid circuit including a first line for carrying fluid from the second pump means to the second motor means for driving said second motor means in a forward direction, and a second line for carrying fluid from the second pump means to the second motor means for driving said second motor means in a reverse direction, first means having fluid flow restricting means interconnecting the first lines of the first and second fluid circuit whereby fluid under high pressure in one of the first lines flows to the other first line to increase the fluid pressure in said other first line, and second means having fluid flow restricting means interconnecting the second lines of the first and second fluid circuit whereby fluid under high pressure in one of the second lines flows to the other second line to increase the fluid pressure in said other second line.

* * * * *